US008673028B2

(12) United States Patent
Savage et al.

(10) Patent No.: US 8,673,028 B2
(45) Date of Patent: Mar. 18, 2014

(54) METHOD OF PRODUCING BIODIESEL FROM A WET BIOMASS

(75) Inventors: Phillip E. Savage, Ann Arbor, MI (US); Robert Levine, Ann Arbor, MI (US); Tanawan Pinnarat, Bangkok (TH)

(73) Assignee: The Regents of the University of Michigan, Ann Arbor, MI (US)

( * ) Notice: Subject to any disclaimer, the term of this patent is extended or adjusted under 35 U.S.C. 154(b) by 328 days.

(21) Appl. No.: 13/224,872

(22) Filed: Sep. 2, 2011

(65) Prior Publication Data

US 2012/0079760 A1 Apr. 5, 2012

Related U.S. Application Data

(60) Provisional application No. 61/379,648, filed on Sep. 2, 2010.

(51) Int. Cl.
*C10L 1/18* (2006.01)
(52) U.S. Cl.
USPC ............................... 44/388; 554/174; 435/134
(58) Field of Classification Search
USPC ............................... 44/388; 554/174; 435/134
See application file for complete search history.

(56) References Cited

U.S. PATENT DOCUMENTS

| 8,142,659 | B2* | 3/2012 | Kale | 210/634 |
|---|---|---|---|---|
| 8,152,870 | B2* | 4/2012 | Kale | 44/385 |
| 8,197,691 | B2* | 6/2012 | Kale | 210/634 |
| 8,313,648 | B2* | 11/2012 | Kale et al. | 210/638 |
| 2008/0160593 | A1 | 7/2008 | Oyler | |
| 2008/0188676 | A1 | 8/2008 | Anderson et al. | |
| 2009/0077864 | A1 | 3/2009 | Marker et al. | |
| 2009/0081748 | A1 | 3/2009 | Oyler | |
| 2009/0112008 | A1 | 4/2009 | McNeff | |
| 2009/0318740 | A1 | 12/2009 | Guillon et al. | |
| 2009/0326290 | A1 | 12/2009 | Bouchy et al. | |
| 2010/0015677 | A1 | 1/2010 | Iversen et al. | |
| 2010/0050502 | A1 | 3/2010 | Wu et al. | |
| 2010/0081835 | A1 | 4/2010 | Wu et al. | |
| 2011/0056124 | A1 | 3/2011 | Heilmann et al. | |

FOREIGN PATENT DOCUMENTS

| WO | 2010016441 A1 | 2/2010 |
|---|---|---|
| WO | 2010030197 A1 | 3/2010 |

OTHER PUBLICATIONS

Lascaray, L.; 1949; Mechanism of Fat Splitting; Industrial & Engineering Chemistry 41 (4), 786-90.
Lee, J.Y., Yoo, C., Jun, S.Y., Ahn, C.Y., Oh, H.; 2009b; Comparison of Several Methods for Effective Lipid Extraction from Microalgae; Bioresource Technology 101 (1); pp. S75-S77.
Lepage, G., Roy, C.C.; 1984; Improved Recovery of Fatty Acid Through Direct Transesterification without Prior Extraction or Purification; Journal of Lipid Research 25; pp. 1391-1396.

(Continued)

*Primary Examiner* — Cephia D Toomer
(74) *Attorney, Agent, or Firm* — Howard & Howard Attorneys PLLC (57) ABSTRACT

A method of producing a biodiesel from a wet biomass is provided. The method includes providing the wet biomass that includes water and biomass solids. The method also includes heating the wet biomass at a first temperature and a first pressure for a time period ranging from 10 to 480 minutes to form an aqueous solution and a solid agglomerate containing a hydrolyzed lipid component. The method also includes step of transesterifying the hydrolyzed lipid component to form biodiesel.

18 Claims, 1 Drawing Sheet

(56) References Cited

OTHER PUBLICATIONS

Lepage, G., Roy, C.C.; 1986; Direct Transesterification of all Classes of Lipids in a One Step Reaction; Journal of Lipid Research 27; 114; pp. 114-120.

Lewis, T., Nichols, P.D., McMeekin, T.A.; 2000; Evaluation of Extraction Methods for Recovery of Fatty Acids from Lipid-Producing Microheterotrophs; Journal of Microbiological Methods 43 (2); pp. 107-116.

Li, L, E Coppola, J Rine, JL Miller, D Walker; Catalytic Hydrothermal Conversion of Triglycerides to Non-Ester Biofuels; Energy & Fuels, vol. 24; 2009.

Li, X., Xu, H., Wu, Q.; 2007; Large-Scale Biodiesel Production from Microalga Chlorella Protothecoides Through Heterotrophic Cultivation in Bioreactors; Biotechnology and Bioengineering 98 (4); pp. 764-771.

Marulanda, VF, G Anitescu, LL Tavlarides; Biodiesel Fuels Through a Continuous Flow Process of Chicken Fat Supercritical Transesterification; Energy & Fuels, vol. 24; 2010.

Mills, V, HK McClain; Fat Hydrolysis; Ind Eng Chem, vol. 41(9); 1949.

Minami, E., Saka, S.; 2006; Kinetics of Hydrolysis and Methyl Esterification for Biodiesel Production in Two-Step Supercritical Methanol Process; Fuel 85 (17-18); pp. 2479-2483.

Moquin, P.H.L., Temelli, F.; 2008; Kinetic Modeling of Hydrolysis of Canola Oil in Supercritical Media; Journal of Supercritical Fluids 45 (1); pp. 94-101.

Özgül, S., Türkay, S.; 1993; In Situ Esterification of Rice Bran Oil with Methanol and Ethanol; Journal of the American Oil Chemists' Society 70 (2); pp. 145-147.

Pinnarat, T., Savage, P.; 2008; Assessment of Noncatalytic Biodiesel Synthesis Using Supercritical Reaction Conditions; Industrial & Engineering Chemistry Research 47 (18); pp. 6801-6808.

Pinto, J.S.S., Lancas, F.; 2006; Hydrolysis of Corn Oil Using Subcritical Water; J. Braz. Chem. Soc. 17 (1); pp. 85-89.

Rodríguez-Ruiz, J., Belarbi, EH., Sánchez, J.L.G., Alonso, D.L.; 1998; Rapid Simultaneous Lipid Extraction and Transesterification for Fatty Acid Analyses; Biotechnology Techniques 12 (9); pp. 689-691.

Saka, S., Kusdiana, D.; 2001; Biodiesel Fuel from Rapeseed Oil as Prepared in Supercritical Methanol; Fuel; 80; pp. 225-231.

Sevilla, M., Fuertes, A.; 2009; The Production of Carbon Materials by Hydrothermal Carbonization of Cellulose; Carbon 47 (9); pp. 2281-2289.

Tan, K.T., Lee, K.T., Mohamed, A.R.; 2009; Production of FAME by Palm Oil Transesterification Via Supercritical Methanol Technology; Biomass and Bioenergy 33 (8); pp. 1096-1099.

Temelli, F.; 2009; Perspectives on Supercritical Fluid Processing of Fats and Oils; Journal of Supercritical Fluids 47 (3); pp. 583-590.

Titirici, M. M., Thomas, A., Yu, S.-H., Muller, J. O., Antonietti, M.; 2007; A Direct Synthesis of Mesoporous Carbons with Bicontinuous Pore Morphology from Crude Plant Material by Hydrothermal Carbonization; Chemistry of Materials 19 (17); pp. 4205-4212.

Vieitez, I., Da Silva, C., Borges, G., Corazza, F., Oliveira, J., Grompone, M., Jachmanián, I.; 2008a; Continuous Production of Soybean Biodiesel in Supercritical Ethanol—Water Mixtures; Energy & Fuels 22 (4); pp. 2805-2809.

Vieitez, I., Silva, C., Alckmin, I., Borges, G.; 2008b; Effect of Temperature on the Continuous Synthesis of Soybean Esters Under Supercritical Ethanol; Energy & Fuels 23 (1); pp. 558-563.

Wahlen, B., Barney, B., Seefeldt, L.; 2008; Synthesis of Biodiesel from Mixed Feedstocks and Longer Chain Alcohols Using an Acid-Catalyzed Method; Energ Fuel 22 (6); pp. 4223-4228.

Warabi, Y., Kusdiana, D., Saka, S.; 2004; Reactivity of Triglycerides and Fatty Acids of Rapeseed Oil in Supercritical Alcohols; Bioresource Technology 91 (3); pp. 283-287.

Xiong, W., Gao, C., Yan, D., Wu, C., Wu, Q.; 2010; Double CO(2) Fixation in Photosynthesis-Fermentation Model Enhances Algal Lipid Synthesis for Biodiesel Production; Bioresource Technology 101 (7); pp. 2287-2293.

Xu, H., Miao, X., Wu, Q.; 2007; High Quality Biodiesel Production from a Microalga Chlorella Protothecoides by Heterotrophic Growth in Fermenters; Journal of Biotechnology 9.

Peterson A.A., Vogel F., Lachance R.P., Fröling M., Antal JR M.J., Tester J.W.; Thermochemical Biofuel Production in Hydrothermal Media: A Review of Sub- and Supercritical Water Technologies; Energy & Environmental Science; 2008; 1; pp. 32-65.

Akiya N., Savage P.E.; Roles of Water for Chemical Reactions in High-Temperature Water, Chem. Rev.; 2002;102; pp. 2725-2750.

Savage P.E.; Organic Chemical Reactions in Supercritical Water; Chem. Rev., 1999; 99; pp. 603-622.

Dote Y., Sawayama S., Inoue S., Minowa T., Yokoyama S.-Ya; Recovery of Liquid Fuel from Hydrocarbon-Rich Microalgae by Thermochemical Liquefaction; Fuel; 1994; 74; pp. 1375-1378.

Ikenaga N.-Oki, Ueda C., Matsui T., Ohtsuki M., Suzuki T.; Co-Liquefaction of Micro Algae with Coal Using Coal Liquefaction Catalysts; Energy & Fuels; 2001; 15; pp. 350-355.

Kumar S., Gupta R.B.; Biocrude Production from Switchgrass Using Subcritical Water; Energy Fuels; 2009; 23; pp. 5151-5159.

Umeki K., Yamamoto K., Namioka T., Yoshikawa K.; High Temperature Steam-Only Gasification of Woody Biomass; Appl. Energy; 2010; 87; pp. 791-798.

Savage P.E., Levine R.B., Huelsman C.M., Hydrothermal Processing of Biomass, Chapter 8 in Thermochemical Conversion of Biomass to Liquid Fuels and Chemicals; Crocker M., Ed., Royal Soc. Chem., pub, 2010; pp. 190-219.

Merkle, Peter B.; Recovery of Biodiesel Precursors from Heterotrophic Microalga Chlorella protothecoides; Sandia Corporation, a Lockheed Martin Company; 2007; 11 pages.

"Catalytic Hydrothermal Hydrodenitrogenation of Pyridine"; Peigao Duan, PhD and Phillip E. Savage; University of Michigan; Manuscript No. APCATB-D-11-00603R1; Jul. 27, 2011; 52 pages.

"Catalytic Hydrothermal Deoxygenation of Palmitic Acid"; Jie Fu, Xiuyang Lu and Phillip E. Savage; Energy and Environmental Science 2010, 3; The Royal Society of Chemistry 2010; www.rsc.org/ees; pp. 311-317.

"Activated Carbons for Hydrothermal Decarboxylation of Fatty Acids"; Jie Fu, Fan Shi, L.T. Thompson, Jr., Xiuyang Lu, and Phillip E. Savage; Department of Chemical Engineering, University of Michigan, Ann Arbor, Michigan 48109, United States; Department of Chemical and Biological Engineering, Zhejiang University, Hangzhou 310027, China; ACS Catalysis; pubs.acs.org/acscatalysis; pp. 227-231; 2011.

"Triflate-Catalyzed (Trans)esterification of Fatty Acids, Triglycerides, and Lipids within Carbonized Algal Biomass"; Robert B. Levine, Matthew D. Durham, and Phillip E. Savage; Department of Chemical Engineering, University of Michigan, Ann Arbor, MI 48109; 5 pages; Mar. 22, 2011.

"Catalytic Treatment of Crude Algal Bio-Oil in Supercritical Water: Optimization Studies"; Peigao Duan and Phillip. E. Savage; Energy and Environmental Science 2011, 4; The Royal Society of Chemistry 2011; www.rsc.org/ees; pp. 1447-1456.

"Catalytic Hydrotreatment of Crude Algal Bio-Oil in Supercritical Water"; Peigao Duan and Phillip E. Savage; College of Physics and Chemistry, Department of Applied Chemistry, Henan Polytechnic University, No. 2001, Century Avenue, Jiaozuo 4540003, Henan, PR China; Department of Chemical Engineering, University of Michigan, Ann Arbor, Michigan 48109, United States; Applied Catalysis B: Environmental 104 (2011); pp. 136-143.

"Upgrading of Crude Algal Bio-oil in Supercritical Water"; Peigao Duan and Phillip E. Savage; Chemical Engineering Department, University of Michigan, Ann Arbor, MI 48109-2136, USA; Bioresource Technology 102 (2011); pp. 1899-1906; journal homepage: www.elsevier.com/locate/biortech.

"Clean Speed Ahead with Catalysts"; J R Anderson, FAA; Nova Science in The News; Australian Academy of Science; Nov. 2008; www.science.org.au/nova/112/112key.htm; 6 pages.

"Hydrothermal Decarboxylation and Hydrogenation of Fatty Acids Over Pt/C"; Jie Fu, Xiuyang Lu and Phillip E. Savage; ChemSusChem 2011, 4, pp. 1-7; 2011 Wiley-VCH Verlag GmbH & Co. KGaA, Weinheim.

"Hydrothermal Liquefaction and Gasification of *Nannochloropsis* sp."; Tylisha M. Brown, Peigao Duan and Phillip E. Savage; Depart- (56) References Cited

OTHER PUBLICATIONS ment of Chemical Engineering, University of Michigan, Ann Arbor, Michigan 48109-2136; Energy & Fuels 2010, 24, pp. 3639-3646.
"Biodiesel Production from Wet Algal Biomass Through in Situ Lipid Hydrolysis and Supercritical Transesterification"Robert B. Levine, Tanawan Pinnarat and Phillip E. Savage; Department of Chemical Engineering, University of Michigan, 2300 Hayward Drive, Ann Arbor, Michigan; Received Jun. 30, 2010; Revised Manuscript Received Aug. 12, 2010; Energy & Fuels 2010, 24, pp. 5235-5243
"Characterization of Product Fractions from Hydrothermal Liquefaction of *Nannochloropsis* sp. and the Influence of Solvents"; Peter J. Valdez, Jacob G. Dickinson and Phillip E. Savage; Department of Chemical Engineering, University of Michigan, Ann Arbor, Michigan 48109-2136, United States; Energy & Fuels; 9 pages.
"Hydrothermal Liquefaction of a Microalga with Heterogeneous Catalysts"; Peigao Duan and Phillip E. Savage; Chemical Engineering Department, University of Michigan, Ann Arbor, Michigan, 48109-2136; Ind. Eng. Chem. Res. 2011, vol. 50, No. 1; pp. 52-61.
"Pressure-cooking Algae into a Better Biofuel"; Phillip E. Savage; University of Michigan; Apr. 20, 2010; www.ns.umich.edu/htdoc/releases/plainstory.php?id=7645; 2 pages.
"Biodiesel Production From Algae by Supercritical Methanol and Liquefaction Method"; Prafulla Patil, Shuguang Deng; New Mexico State University, Las Cruces, NM; AIChE, 2009.
Highly Selective Catalytic Conversion of Phenolic Bio-Oil to Alkanes; Chen Zhao 1, Yuan Kou, Prof. Dr. 2 *, Angeliki A. Lemonidou, Prof. Dr. 1 3, Xuebing Li, Dr. 1, Johannes A. Lercher, Prof. Dr. 1* Angewandte; Chemie International Edition, vol. 48, Issue 22, pp. 3987-3990; 2009.
Alenezi, R., Baig, M., Wang, J., Santos, R.; 2010; Continuous Flow Hydrolysis of Sunflower Oil for Biodiesel. Energy Sources, Part A 32 pp. 460-468.
Alenezi, R., Leeke, G., Santos, R., Khan, A.; 2009; Hydrolysis Kinetics of Sunflower Oil Under Subcritical Water Conditions; Chemical Engineering Research and Design 87 (6); pp. 867-873.
Alenezi, R., Leeke, G., Winterbottom, J., Santos, R., Khan, A.; 2010; Esterification Kinetics of Free Fatty Acids with Supercritical Methanol for Biodiesel Production; Energy Conversion and Management.
Anitescu, G., Deshpande, A., Tavlarides, L.; 2008; Integrated Technology for Supercritical Biodiesel Production and Power Cogeneration; Energy & Fuels 22 (2), pp. 1391-1399.
Behrendt, F., Neubauer, Y., Oevermann, M., Wilmes, B., Zobel, N.; 2008; "Direct Liquefaction of Biomass"; Chem. Eng. Technol. 31 (5), pp. 667-677.
Bertoldi, C, CDA Silva, JP Bernardon, ML Corazza, LC; Continuous Production of Biodiesel From Soybean Oil in Supercritical Ethanol and; Energy & Fuels, vol. 23, 2009.
Brunner, G.; 2009; "Near Critical and Supercritical Water"; Part I. Hydrolytic and Hydrothermal Processes; The Journal of Supercritical Fluids 47; pp. 373-381.
Chen, C., Chen, W., Chang, C., Lai, S.M., Tu, C.H.; 2010; "Biodiesel Production from Supercritical Carbon Dioxide Extracted Jatropha Oil Using Subcritical Hydrolysis and Supercritical Methylation"; The Journal of Supercritical Fluids.
Cheng, Y., Zhou, W., Gao, C., Lan, K., Gao, Y., Wu, Q.; 2009; "Biodiesel Production from Jerusalem Artichoke (*Helianthus tuberosus* I.) Tuber by Heterotrophic Microalgae *Chlorella* Protothecoides"; Journal of Chemical Technology & Biotechnology 84 (5).
Chisti, Y.; 2007; "Biodiesel from Microalgae"; Biotechnology Advances 25 (3), pp. 294-306.
Cooney, M., Young, G., Nagle, N.; 2009; Extraction of Bio-Oils from Microalgae; Separation & Purification.
D'Ippolito, S.A., Yori, J., Iturria, M., Pieck, C., Vera, C.; 2007; Analysis of a Two-Step, Noncatalytic, Supercritical Biodiesel Production Process with Heat Recovery; Energy and Fuels 21 (1), pp. 339-346.

Demirbas, A.; 2009; Production of Biodiesel Fuels from Linseed Oil Using Methanol and Ethanol in Non-Catalytic SCF Conditions; Biomass & Bioenergy 33 (1), pp. 113-118.
Deshpande, A., Anitescu, G., Rice, P., Tavlarides, L.; 2010; Supercritical Biodiesel Production and Power Cogeneration: Technical and Economic Feasibilities; Bioresource Technology 101 (6), pp. 1834-1843.
Ehimen, E., Sun, Z F., Carrington, C.; 2010; Variables Affecting the In Situ Transesterification of Microalgae Lipids; Fuel 89; pp. 677-684.
Georgogianni, K., Kontominas, M., Pomonis, P., Avlonitis, D., Gergis, V.; 2008; Conventional and In Situ Transesterification of Sunflower Seed Oil for the Production of Biodiesel; Fuel Processing Technology 89 (5); pp. 503-509.
Haas, M., Scott, K.; 2007; Moisture Removal Substantially Improves the Efficiency of In Situ Biodiesel Production from Soybeans; J Amer Oil Chem Soc 84 (2); pp. 197-204.
Hara, A., Radin, N.; 1978; Lipid Extraction of Tissues with a Low-Toxicity Solvent; Analytical Biochemistry 90 (1); pp. 420-426.
Harrington, K., D'Arcy-Evans, C.; 1985; Transesterification In Situ of Sunflower Seed Oil; Industrial & Engineering Chemistry Product Research and Development 24 (2); pp. 314-318.
He, H., Wang, T., Zhu, S.; 2007; Continuous Production of Biodiesel Fuel from Vegetable Oil Using Supercritical Methanol Process; Fuel 86 (3); pp. 442-447.
Hegel, P., Mabe, G., Pereda, S., Brignole, E.; 2007; Phase Transitions in a Biodiesel Reactor Using Supercritical Methanol; Industrial and Engineering Chemistry Research 46 (19); pp. 6360-6365.
Heilmann, S., Davis, H., Jader, L., Lefebvre, P., Sadowsky, M., Schendel, F., Von Keitz, M.G., Valentas, K.; 2010; Hydrothermal Carbonization of Microalgae; Biomass and Bioenergy doi:10.1016/j.biombioe.2010.01.032.
Holliday, R., King, J., List, G.; 1997; Hydrolysis of Vegetable Oils in Sub-and Supercritical Water; Industrial & Engineering Chemistry Research 36 (3); pp. 932-935.
Hu, Q., Sommerfeld, M., Jarvis, E., Ghirardi, M., Posewitz, M., Seibert, M., Darzins, A.; 2008; Microalgal Triacylglycerols as Feedstocks for Biofuel Production: Perspectives and Advances; The Plant Journal 54 (4); pp. 621-639.
Huang, G., Chen, F., Wei, D., Zhang, X., Chen, G.; 2010; Biodiesel Production by Microalgal Biotechnology; Applied Energy 87 (1); pp. 38-46.
Imahara, H., Minami, E., Hari, S., Saka, S.; 2008; Thermal Stability of Biodiesel in Supercritical Methanol; Fuel 87 (1); pp. 1-6.
Kaparthi, R., Chari, K.; 1959; Solubilities of Vegetable Oils in Aqueous Ethanol and Ethanol-Hexane Mixtures; Journal of the American Oil Chemists' Society 36 (2); pp. 77-80.
Kasim, N., Tsai, T., Gunawan, S., Ju, Y.H.; 2009; Biodiesel Production from Rice Bran Oil and Supercritical Methanol; Bioresource Technology 100 (8); pp. 2399-2403.
King, J., Holliday, R., List, G.; 1999; Hydrolysis of Soybean Oil in a Subcritical Water Flow Reactor; Green Chemistry 1; pp. 261-264.
King, J., Srinivas, K.; 2009; Multiple Unit Processing Using Sub- and Supercritical Fluids; Journal of Supercritical Fluids 47 (3); pp. 598-610.
Knothe, G.; 2005; Dependence of Biodiesel Fuel Properties on the Structure of Fatty Acid Alkyl Esters; Fuel Processing Technology 86 (10); pp. 1059-1070.
Kusdiana, D., Saka, S.; 2001; Kinetics of Transesterification in Rapeseed Oil to Biodiesel Fuel as Treated in Supercritical Methanol; Fuel 80 (5); pp. 693-698.
Kusdiana, D., Saka, S.; 2004a; Two-Step Preparation for Catalyst-Free Biodiesel Fuel Production; Applied Biochemistry and Biotechnology; pp. 113-116 and 781-791.
Kusdiana, D., Saka, S.; 2004b; Effects of Water on Biodiesel Fuel Production by Supercritical Methanol Treatment; Bioresource Technology 91 (3); pp. 289-295.

* cited by examiner

METHOD OF PRODUCING BIODIESEL FROM A WET BIOMASS

CROSS-REFERENCE TO RELATED APPLICATION

This application claims the benefit of U.S. Provisional Application No. 61/379,648, filed on Sep. 2, 2010, the disclosure of which is incorporated by reference in its entirety.

FIELD OF THE INVENTION

The present invention generally relates to a method of producing biodiesel, specifically to a method of producing biodiesel from a wet biomass.

BACKGROUND OF THE INVENTION

Worldwide energy demand, particularly for fossil fuels, is rising as populations increase and nations develop. Concurrently, concerns regarding climate change, declining fossil fuel reserves, and national security have moved to the forefront of society. These concerns have largely arisen due to unpredictable energy costs as well as a greater understanding of the effects of burning fossil fuels and the emissions released therefrom. Individuals and countries alike are searching for alternative energy sources that may supplement or even replace fossil fuels. Biodiesel is being explored as one promising alternative energy source.

Biodiesel is a liquid fuel composed of fatty acid alkyl esters generally derived from biomass feedstocks that contain lipids (e.g., triacylglycerides). Biodiesel can be classified based on the feedstock used to produce it. First-generation biodiesel is typically produced from edible biomass containing oils such as soybeans and canola. Generally, the edible biomass is harvested and dried, the oil is extracted using organic solvents (e.g., hexane), and the oils are transesterified into biodiesel. These terrestrial crops require large amounts of arable land, freshwater, fertilizers, and must be allocated from food production to fuel production therefore leading to a competition of "fuel vs. food." Second-generation biodiesels are produced from non-edible biomass feedstocks, such as jatropha, and utilize a similar method of preparation as first generation biodiesels. Third-generation biodiesel generally refers to the use of algae as a feedstock.

Although promising, the use of wet biomass such as algae to produce biodiesel is complicated by their cultivation in dilute aqueous suspensions. Furthermore, existing processes for producing biodiesel from algae generally require energy and cost intensive dewatering steps, processing steps, and long production times.

Accordingly, there remains an opportunity to develop a method of producing biodiesel from a wet biomass to minimize the cost and environmental impact of biomass processing, dewatering, and oil conversion to biodiesel while maximizing production efficiencies.

SUMMARY OF THE INVENTION AND ADVANTAGES

A method of producing biodiesel from a wet biomass is provided. The method includes providing the wet biomass comprising water and biomass solids. The method also includes heating the wet biomass at a first temperature and a first pressure for a time period ranging from 10 to 200 minutes to form an aqueous solution and a solid agglomerate containing a hydrolyzed lipid component, with the first temperature ranging from 150 to 300° C. and with the proviso that at least a portion of the water present in the wet biomass is in a liquid phase throughout the step of heating to form the aqueous solution and the solid agglomerate. The first temperature and first pressure are below super-critical conditions for water. The method also the step of transesterifying the hydrolyzed lipid component to form biodiesel.

The method described herein may minimize the need for extensive dewatering steps as the solid agglomerate is easily separated from the aqueous solution (if desired). Furthermore, the method does not require the wet biomass to be dried or to undergo oil-water separation before heating at the first temperature and the first pressure. In some embodiments, the method also does not require elimination of biomass byproducts before isolation of the hydrolyzed lipid component can be attained. Furthermore, the method minimizes biodiesel synthesis time and minimizes prevalence of heteroatoms in the biodiesel.

BRIEF DESCRIPTION OF THE DRAWINGS

Other advantages of the present invention will be readily appreciated, as the same becomes better understood by reference to the following detailed description when considered in connection with the accompanying drawings.

DETAILED DESCRIPTION OF THE INVENTION

A method of producing a biodiesel from a wet biomass is provided. The method includes providing the wet biomass comprising water and biomass solids. Typically, the biomass solids include, but are not limited to, organisms, e.g., multicellular organisms, single-celled organisms, cell fragments/components of the multicellular or single celled organisms, e.g., organelles, proteins, lipids, and the like. In one embodiment, the biomass solids comprise microalgae. Specific examples of microalgae include, but are not limited to, *Chlorella vulgaris, Chlorella protothecoides, Nannochloris* sp., *Nannochloropsis* sp., and *Dunaliella* sp. However, it is to be appreciated that any biomass solids can be used based off of selection criteria including, but not limited to, lipid yields, fatty acid profile, growth/reproduction rate, photosynthetic efficiency, and the like.

The method may include the step of growing the biomass solids. Typically, the biomass solids are grown in at least one bioreactor. Suitable examples of the bioreactor include, but are not limited to, open ponds, closed photobioreactors, continuously-fed bubble column reactors, and stirred tanks. The biomass solids may be grown phototrophically, mixotrophically, photoheterotrohically, and/or heterotrophically. In one embodiment, the biomass solids are grown phototrophically in a series of continuously-fed bubble column reactors and then heterotrophically in a stirred tank. Without being bound to any particular theory, it is believed that sequential phototrophic and heterotrophic growth of the biomass solids increases biomass density, lipid productivity, lipid content, and carbon substrate utilization efficiency of the biomass solids. Furthermore, a sequential growth strategy involving illuminated then unlit growth reactors enhances the fatty acid profile of algae such that it contains a reduced proportion of polyunsaturated fatty acids at the time of harvest. This is beneficial to improve the oxidative stability of the biodiesel fuel.

The step of growing the biomass solids may include treating the biomass solids to maximize lipid productivity and/or biomass density. Typically, the biomass solids are treated by chemical and/or physical stimulation. Suitable examples of chemical and/or physical stimulation include, but are not limited to, manipulating nutrient concentration, pH, temperature, irradiance, genes, and combinations thereof. In one embodiment, the biomass solids are subjected to nitrogen stress. In another embodiment, the biomass solids are grown on glucose and in heterotrophic growth conditions for a period of time that may range from 1 to 10 days, or, alternatively, from 4 to 8 days, or, alternatively, from 6 to 8 days. Without being bound to any particular theory, it is believed that treating the biomass solids with nitrogen stress in heterotrophic growth conditions also improves lipid productivity of the biomass solids.

The method may further include the step of dewatering the wet biomass. Suitable examples of dewatering techniques include, but are not limited to, centrifugation, gravity sedimentation, autoflocculation, flocculation with organic or microbial products, in-situ microbial flocculation, dissolved air flotation, belt filtration, membrane filtration, and combinations thereof. Dewatering techniques may be used to increase the density of the wet biomass. However, it is to be appreciated that the step of dewatering is optional.

As noted above, the wet biomass comprises biomass solids and water. The density of the wet biomass is typically measured as a percentage by weight of the biomass solids, based on the total weight of the wet biomass. In one embodiment, the biomass solids may be present in the wet biomass in an amount ranging from 5 to 35 wt. %, or, alternatively, from 10 to 30 wt. %, or, alternatively, from 15 to 25 wt. %, based on the total weight of the wet biomass. The balance of the wet biomass is typically water.

The water in the wet biomass may be derived from a variety of sources, and is not limited to any particular source. The water may be further defined as fresh water, brackish water, seawater, or wastewater. The water may be present in the biomass solids in an amount ranging from 60 to 99 wt. %, or, alternatively, from 70 to 95 wt. %, or, alternatively, from 80 to 95 wt. %, or alternatively, from 85 to 95 wt. %, all based on the total weight of the wet biomass.

The lipid content of the biomass solids is typically measured as a percentage by weight of all lipids present in the biomass solids on a dry weight basis. In one embodiment, the biomass solids have a lipid content ranging from 20 to 60 wt. %, or, alternatively, from 40 to 60 wt. %, or, alternatively, from 40 to 50 wt. %, all based on the total weight of the dry biomass solids.

The lipid profile of the biomass solids is typically measured as a percentage by weight of particular lipids based on the total weight of all lipids present in the biomass solids. In one embodiment, the wet biomass has a lipid profile of triglycerides present in an amount ranging from 80 to 99 wt. %, diglycerides present in an amount ranging from 1 to 10 wt. %, monoglycerides present in an amount ranging from <1 to 5 wt. %, and fatty acids present in an amount ranging from 1 to 10 wt. %, all based on the total weight of all lipids present in the biomass solids. Alternatively, the wet biomass has a lipid profile of triglycerides present in an amount ranging from 85 to 95 wt. %, diglycerides present in an amount ranging from 1 to 5 wt. %, monoglycerides present in an amount ranging from less than 1 to 2 wt. %, and fatty acids present in an amount ranging from 1 to 5 wt. %, all based on the total weight of all lipids present in the biomass solids. Alternatively still, the wet biomass has a lipid profile of triglycerides present in an amount ranging from 90 to 95 wt. %, diglycerides present in an amount ranging from 2 to 3 wt. %, monoglycerides present in an amount of <1 wt. % by weight, and fatty acids present in an amount ranging from 2 to 5 wt. %, all based on the total weight of all lipids present in the biomass solids.

The biomass solids has a fatty acid profile which is typically measured as a percentage by weight of particular fatty acids based on the total weight of all fatty acids present in the biomass solids. In one embodiment, the wet biomass has a fatty acid profile of oleic acid present in an amount ranging from 40 to 50 wt. %, palmitic acid present in an amount ranging from 15 to 25 wt. %, linolenic acid present in an amount ranging from 10 to 20 wt. %, and linoeic acid present in an amount ranging from 5 to 20 wt. %, all based on the total weight of all fatty acids present in the biomass solids. Alternatively, the wet biomass has a fatty acid profile of oleic acid present in an amount ranging from 45 to 50 wt. %, palmitic acid present in an amount ranging from 15 to 20 wt. %, linolenic acid present in an amount ranging from 10 to 15 wt. %, and linoeic acid present in an amount ranging from 5 to 15 wt. %, all based on the total weight of all fatty acids present in the biomass solids. Alternatively still, the wet biomass has fatty acid profile of oleic acid present in an amount of 45 to 48 wt. %, palmitic acid present in an amount ranging from 17 to 20 wt. %, linolenic acid present in an amount ranging from 12 to 15 wt. %, and linoeic acid present in an amount ranging from 8 to 12 wt. %, all based on the total weight of all fatty acids present in the biomass solids. Without being bound to any particular theory, it is believed that growing the biomass solids on glucose and in heterotrophic growth conditions will minimize the percentage of linolenic acid and maximize the amount of oleic acid in the biomass solids, therefore providing a wet biomass capable of forming biodiesel with excellent cold flow properties and oxidative stability.

The biomass solids may have an elemental composition of carbon present in an amount ranging from 50 to 70 wt. %, hydrogen present in an amount ranging from 5 to 20 wt. %, oxygen present in an amount ranging from 20 to 40 wt. %, and nitrogen present in an amount ranging from less than 1 to 10 wt. %, all based on the total weight of the biomass solids. Alternatively, the biomass solids may have an elemental composition of carbon present in an amount ranging from 50 to 60 wt. %, hydrogen present in an amount ranging from 5 to 15 wt. %, oxygen present in an amount ranging from 20 to 35 wt. %, and nitrogen present in an amount ranging from 1 to 10 wt. %, all based on the total weight of all solids present in the biomass solids. Alternatively still, the biomass solids may have an elemental composition of carbon present in an amount ranging from 55 to 60 wt. %, hydrogen present in an amount ranging from 5 to 10 wt. %, oxygen present in an amount ranging from 25 to 35 wt. %, and nitrogen present in an amount ranging from 1 to 5 wt. %, all based on the total weight of the biomass solids.

The biomass solids have a heat of combustion, measured using the Dulong formula and neglecting the contribution of sulfur, ranging from 20 to 35 MJ/kg, or, alternatively, from 25 to 30 MJ/kg.

Figure 1:
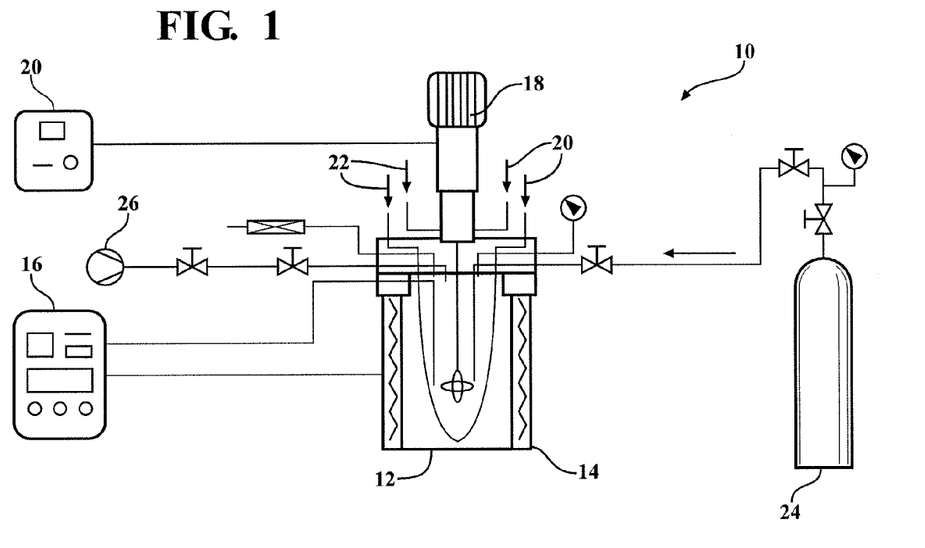
FIG. 1 is a schematic of a reaction vessel that may be used for heating a wet biomass at the first temperature and the first pressure in accordance with one embodiment of the method described herein.
Figure 2:
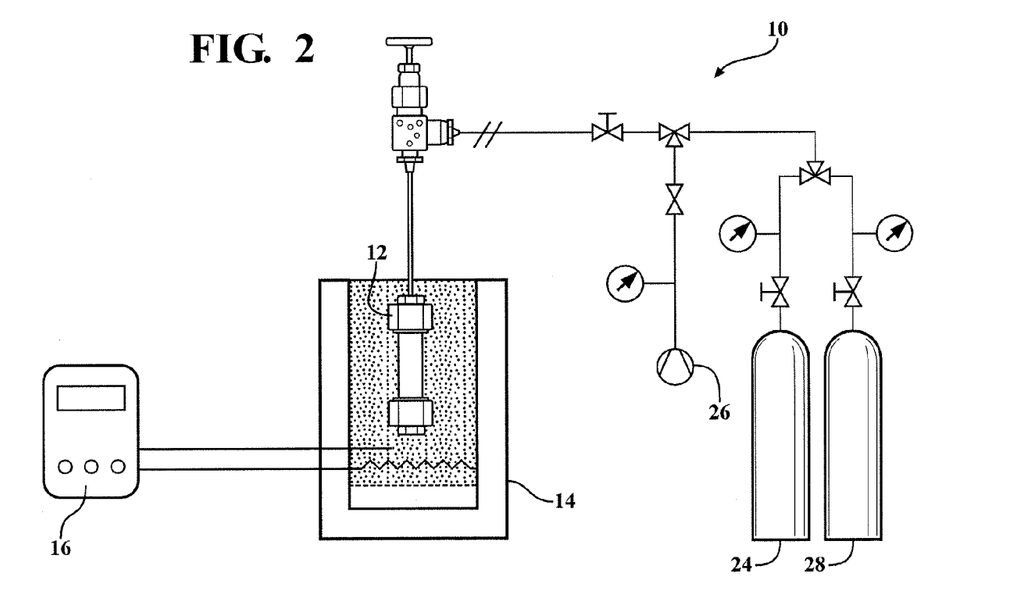
FIG. 2 is a schematic of a reaction vessel that may be used for heating the hydrolyzed lipid component and alcohol to form biodiesel in accordance with one embodiment of the method described herein.

The method disclosed herein may be performed in a variety of devices, as will be appreciated by one of ordinary skill in the art. Referring to FIG. 1, in one embodiment, the method may be performed in a biomass refinement system 10. The heating system may include a reaction vessel 12. The reaction vessel 12 has a design and configuration to withstand the temperature and pressure conditions of the method described herein. In one embodiment, the reaction vessel 12 is an autoclave. The reaction vessel 12 may be heated with a heating system 14. The heating system 14 may comprise a heating jacket that contacts the reaction vessel 12. The heating jacket 14 may be used in conjunction with other components that may be present in the heating system, such as a thermal sand bath. Alternatively, the heating system 14 may comprise a fluidized sand bath (see FIG. 2). In other embodiments, the reaction vessel 12 may be connected to other devices sufficient to provide isothermal heating. The biomass refinement system 10 may also include a temperature controller 16, operative to control the temperature within the reaction vessel 12.

The biomass refinement system 10 may also include a mixer device 18 and a mixer controller 20. The mixer device 18 may be selected from various paddles, stirrers, and/or agitators, etc., as will be appreciated by one having ordinary skill in the art. The mixer device 18 may serve to mix the wet biomass throughout the step of heating the wet biomass at the first temperature and the first pressure to form the solid agglomerate and the aqueous solution. The mixer controller 20 may be coupled to the mixer device 18 and control the mixing speed of the mixer device 18. The mixer device 18 may also mix the contents of the reaction vessel 12 throughout the step of heating the hydrolyzed lipid component and alcohol to form the biodiesel. It should be appreciated that mixing the reactor is optional.

The biomass refinement system 10 may also include an extrusion reactor in which biomass is loaded and extruded under heated conditions. In one embodiment, this could be a co-rotating, intermeshing, twin-screw extruder. Such devices are well known in the art of producing cereals from high moisture grain feedstock.

The biomass refinement system 10 may also include various input and output streams. In one embodiment, the biomass refinement system 10 may comprise at least one water inlet 20 and at least one water outlet 22 connected to the interior of the reaction vessel 12.

The biomass refinement system 10 may include a vacuum pump 26 coupled to the interior of the reaction vessel 12 to remove air. The biomass refinement system 10 may also include an inert gas system 28 connected to the interior of the reaction vessel.

The method includes the step of heating the wet biomass at the first temperature and the first pressure for a time period ranging from 10 to 480 minutes in a reaction vessel to form an aqueous solution and a solid agglomerate containing a hydrolyzed lipid component. At least a portion of the water present in the wet biomass is in a liquid phase throughout the step of heating to form the aqueous solution and the solid agglomerate and the first temperature and the first pressure are below supercritical conditions of water. The formation of the solid agglomerate allows easy separation of the hydrolyzed lipid component from the aqueous solution through filtration or similar means of separation well known to those familiar with the art. The heating at the first temperature and the first pressure enables a variety of chemical reactions that lead to the formation of the solid agglomerate, including, but not limited to, hydrolysis, dehydration, condensation, and polymerization. In one embodiment, solids agglomeration is accompanied by hydrolysis of the lipid component of the biomass solids. The extent of lipid hydrolysis can be determined by the reaction temperature, time, pressure, and chemical additives to the hydrothermal reaction (e.g., acids and bases). In this case, the step of heating the wet biomass at the first temperature and the first pressure may convert lipids, such as triglycerides and phospholipids, into fatty acids. In another embodiment, the heating temperature is sufficiently low and the time is sufficiently short such that solids agglomeration occurs without significant hydrolysis of lipids. As such, it will be appreciated the hydrolyzed lipid component may be partially or completely hydrolyzed, and include some lipids that have not been completely hydrolyzed. In other words, the hydrolyzed lipid component may comprise hydrolyzed lipids, partially hydrolyzed lipids, or unhydrolyzed lipids.

The pH of the wet biomass can be altered through the addition of various acids or bases such as HCl, $H_2SO_4$, NaOH, KOH, or may be altered with various dissolved gases, such as $CO_2$.

The step of heating the wet biomass at the first temperature and the first pressure is subject to the proviso that at least a portion of the water present in the wet biomass is in a liquid phase throughout the step of heating to form the solid agglomerate and the aqueous solution. By liquid phase, it is meant a substance that is not gaseous or vapor and is in the liquid phase. By liquid phase, it is also referring to a substance that is not a supercritical fluid.

The step of heating the wet biomass at the first temperature and the first pressure may be described as hydrothermal carbonization or wet pyrolysis and the solid agglomerate may be characterized as carbonized solids or hydrochars. When the reaction is conducted such that lipids are hydrolyzed, it may be referred to as in-situ lipid hydrolysis. Lipid hydrolysis is predominately a homogeneous reaction in the oil phase, comprising three reversible, step-wise reactions that convert triglycerides into diglycerides, monoglycerides and glycerol. The rate of hydrolysis is typically slow at first and then increases as fatty acids are formed. This has been attributed to the increased solubility of water in fatty acids compared to triglycerides and the autocatalytic effect of fatty acids. Considering that the lipid profile of the biomass solids may include some fatty acids initially, the fatty acids may help shorten the induction period and lead to more rapid hydrolysis compared to a system containing triglycerides alone. The rate of hydrolysis increases with temperature as the ion product of water increases, dielectric constant decreases, and water becomes more soluble in the oil phase. The degree of hydrolysis at equilibrium is independent of temperature and determined solely by the glycerol concentration of the aqueous solution. Glycerol can react with fatty acids to form monoglyceride, thereby reducing fatty acid yield. In one embodiment, triglycerides in the biomass solids are hydrolyzed in an amount ranging from 50 to 90 wt. %, from 60 to 80 wt. %, or from 65 to 75 wt. %, all based on the total weight of triglycerides present in the biomass solids.

The first temperature and the first pressure are below supercritical conditions of water. By supercritical conditions, it is intended to refer to a set of temperature and pressure conditions that are at or above the critical point of a substance, such that the substance becomes a supercritical fluid. The critical point of water is intended to mean the vapor-liquid critical point. The vapor-liquid critical point is where there are no longer substantial phase boundaries between the liquid and gas phases. The vapor-liquid critical point comprises a critical temperature and a critical pressure. The critical temperature of water is 374° C. at the critical pressure is 22.064 MPa.

The temperature present in the reaction vessel throughout the step of heating the wet biomass to form the aqueous solution and the wet biomass is referred to as the first temperature. The first temperature may range from 150 to 300° C.; from 190 to 275° C.; from 225 to 275° C.; or from 245 to 255° C. Other first temperatures are also contemplated, so long as at least a portion of the water present in the wet biomass is in the liquid phase throughout the step of heating to form the aqueous solution and the solid agglomerate and the first temperature and first pressure remain below super-critical conditions of water.

As one of ordinary skill in the art will appreciate, by heating the reaction vessel at the first temperature, the pressure within the reaction vessel will naturally rise. The result of this pressure increase is predictable through means of one of ordinary skill in the art. In one possible configuration, the reaction vessel can be monitored in order to indirectly ascertain the pressure within the reaction vessel throughout the step of heating the wet biomass at the first temperature and the first pressure.

During the step of heating the wet biomass at the first temperature, an elevated pressure may be present within the reaction vessel. The pressure present in the reaction vessel during the step of heating the wet biomass is referred to as the first pressure. Typically, the first pressure is present throughout the step of heating the wet biomass. The first pressure may range from 0.1 to 25 MPa, from 0.1 to 20 MPa, or from 1 MPa to 10 MPa. The first pressure may be autogenic in one or more embodiments. Other first pressures are also contemplated, so long as at least a portion of the water present in the wet biomass is in the liquid phase throughout the step of heating to form the aqueous solution and the solid agglomerate and that the first temperature and first pressure remain below super-critical conditions of water.

In one embodiment, the first temperature and the first pressure lead to super-heated liquid water being present throughout the step of heating at the first temperature and the first pressure. As will be appreciated by one of ordinary skill in the art, super-heated liquid water exhibits properties that are different from those of liquid water at room temperature. For example, the super-heated water has a lower dielectric constant, fewer and weaker hydrogen bonds, a higher native $H^+$ concentration, and a higher solubility for small organic compounds as compared to liquid water at room temperature. Super-heated water may serve as a solvent, a catalyst, a catalyst precursor, or a reactant, e.g., in a hydrolysis reaction. More specifically, super-heated water may react with the wet biomass by hydrolyzing any lipids present in the wet biomass, rupturing and conglomerating any cells and/or cell fragments/components present in the wet biomass into the solid agglomerate.

The solid agglomerate comprises a conglomeration of cells and/or cell fragments/components, the hydrolyzed lipid component (which may or may not be completely hydrolyzed), as well as any unreacted wet biomass remaining after the step of heating at the first temperature and the first pressure. The solid agglomerate may be carbonized in one or more embodiments. By "carbonized," it is meant that the solid agglomerate has a higher C:O elemental ratio that the starting reactant biomass. The hydrolyzed lipid component may be retained within the solid agglomerate or somehow adsorbed to the surface of the solid.

The solid agglomerate may have a solids yield ranging from 50 to 75 wt. %, or, alternatively, from 55 to 65 wt. % based on the total weight of the biomass solids. By solids yield it is meant the dry mass of carbonized solids exiting the reactor divided by the dry mass of biomass solids which were heated. The solid agglomerate typically comprises the hydrolyzed lipid component present in an amount ranging from 50 to 90 wt. %, or, alternatively, from 60 to 90 wt. %, or, alternatively, from 65 to 85 wt. %, or, alternatively, from 70 to 80 wt. %, all based on the total weight of the dry solid agglomerate. Elemental composition analysis of the solid agglomerate indicates significant condensation reactions occurred between the water and the biomass solids at the first temperature and the first pressure, evidenced by the increased carbon content and a lower H/C ratio.

The solid agglomerate may comprise less than 40 wt. %, less than 30 wt. %, less than 20 wt. %, or less than 10 wt. % water, all based on the total weight of the solid agglomerate. The solid agglomerate typically retains the hydrolyzed lipid component present in an amount of at least 70 wt. % based on the total weight of the hydrolyzed lipid component. Alternatively, the solid agglomerate may retain the hydrolyzed lipid component present in an amount ranging from 70 to 95 wt. %, or from 80 to 90 wt. %, all based on the total weight of the hydrolyzed lipid component. The solid agglomerate may retain an amount of carbon atoms ranging from 60 to 90%, or from 70 to 80% of carbon atoms originally present in the biomass solids.

The hydrolyzed lipid component may comprise at least one fatty acid. The hydrolyzed lipid component may also comprise various amounts of mono-, di-, and tri-glycerides. It is contemplated that the hydrolyzed lipid component may have increased amounts of fatty acids and decreased amounts of triglycerides, as compared to the amount of fatty acids and triglycerides present in the biomass solids. In another embodiment, the hydrolyzed lipid component comprises an amount of fatty acids ranging from 30 to 60 wt. %, or from 40 to 50 wt. %, both based on the total weight of the hydrolyzed lipid component.

In one embodiment, the method further comprises separating the solid agglomerate from the aqueous solution. The solid agglomerate can be separated from the aqueous solution through a variety of separation techniques and devices, such as through filtration or centrifugal separation. In one specific embodiment, the solid agglomerate is filtered from the aqueous solution in a manner such that the hydrolyzed lipid component is predominately within the solid agglomerate.

As mentioned above, the step of heating the wet biomass at the first temperature and at the first pressure forms the aqueous solution. The aqueous solution may be sterile and/or nutrient-rich. In one embodiment, the aqueous solution comprises soluble carbonaceous and nitrogenous compounds including, but not limited to, glycerol and/or at least one amino acid. The release of glycerol into the aqueous phase is advantageous to reduce complications related to glycerol separation during transesterification reactions. The aqueous solution may comprise nitrogen and phosphorous present in an amount ranging from 10 to 100 wt. %, or from 15 to 45 wt. %, both based on the total weight of nitrogen and phosphorous originally present in the biomass solids.

The aqueous solution may comprise fatty acids present in an amount of less than 10 wt. %, less than 5 wt. %, less than 2 wt. %, or less than 0.01 wt. %, all based on the total weight of the aqueous solution. In one embodiment, these fatty acids can be separated from the aqueous phase by centrifugation, with or without prior acidification of the aqueous use using means well known to those familiar with the art. The aqueous solution may have a pH ranging from 4 to 8, from 4 to 7, or from 4 to 6. The aqueous solution may have a soluble chemical oxygen demand ranging from 10 to 20 g/L, from 12 to 19 g/L, or from 13 to 18 g/L.

In one or more embodiments, the solid agglomerate, after separation, is substantially free from the aqueous solution, subject to the water content of the solid agglomerate as described above. However, it is also contemplated that the solid agglomerate may retain various amounts of the aqueous solution.

The aqueous solution is well suited for use as a carbon and/or nitrogen and phosphorous source for additional biomass solids growth and thus may be recycled and used for various downstream and upstream processes. For example, the aqueous solution may be transferred to at least one bioreactor for use as a carbon and/or nitrogen and phosphorous source, even without additional supplements. In another embodiment, the aqueous phase can be recycled to the biomass refinement system for use in subsequent reactions. In another embodiment, a portion of the solid agglomerate can be recycled to the biomass refinement system for us in subsequent reactions.

The step of heating the wet biomass at the first temperature and the first pressure to form the solid agglomerate and the aqueous solution improves downstream efficiency of biodiesel synthesis. As noted above, the solid agglomerate may retain the hydrolyzed lipid component. By "retain," it is intended to refer to the incorporation or holding of the hydrolyzed component within the solid agglomerate or adsorbed to its surface. Also, the formation of the solid agglomerate, which may be separated from the aqueous solution, may provide an alternative dewatering method having minimal costs. Additionally, because the solid agglomerate may retain the hydrolyzed lipid component, it may obviate difficulties with lipid recovery from aqueous systems that generally require energy-intensive (e.g. centrifugation, evaporation), hazardous (e.g. solvent recovery), and expensive (e.g. enzyme) treatments for separation. However, it is to be appreciated that these separation techniques may also be used to separate the solid agglomerate from the aqueous solution.

The method may also include a step where in the solid agglomerate is completely or partially dried prior to storage or subsequent reactions. This can be accomplished through a variety of methods well known to those versed in the art, including, but not limited to, evaporative drying, drum drying, spray drying, etc.

The method also includes the step of transesterifying the hydrolyzed lipid component to form biodiesel. In one embodiment, the hydrolyzed lipid component can be transesterified in-situ (while still contained in the solid agglomerate or in the presence of the solid agglomerate) or the hydrolyzed lipid component may be transesterified after extraction from the solid agglomerate. As such, the method may optionally include the step of extracting the hydrolyzed lipid component from the solid agglomerate with the proviso that the step of extracting the hydrolyzed lipid component is conducted before the step of transesterifying the hydrolyzed lipid component.

The step of transesterifying the hydrolyzed lipid component may performed in a variety of ways. In one embodiment, the step of transesterifying the hydrolyzed lipid component is further defined as heating the hydrolyzed lipid component containing the hydrolyzed lipid component and alcohol to a second temperature of at least 200° C. at a second pressure to form the biodiesel, with the proviso that at least a portion of the alcohol is in a liquid phase or is in a super-critical fluid phase throughout the step of heating to form the biodiesel.

In another embodiment, the step of transesterifying the hydrolyzed lipid component is further defined as heating the hydrolyzed lipid component and alcohol in the presence of an enzyme to form the biodiesel. In yet another embodiment, the step of transesterifying the hydrolyzed lipid component is further defined as heating the hydrolyzed lipid component and alcohol in the presence of a triflate catalyst to form the biodiesel. In yet another embodiment, the step of transesterifying the hydrolyzed lipid component is heating the hydrolyzed lipid component in the presence of an acidic or basic catalyst. Any of these steps may be conducted in the presence of alcohol, methyl acetate, or ethyl acetate.

In any of the above steps of transesterification, the step of transesterifying the hydrolyzed lipid component may be conducted in the presence of water, in varying amounts ranging from 0 to 75 wt. %, based on the total weight of the solid agglomerate.

In any of the above steps of transesterification, the step of transesterifying the hydrolyzed lipid component may be conducted in the presence of various cosolvents, including, but not limited to, $CO_2$, propane, hexane, and combinations thereof.

In one embodiment, the step of transesterifying the hydrolyzed lipid component may further comprise the step of combining the solid agglomerate, which retains, at least a portion of the hydrolyzed lipid component, with an alcohol. Suitable alcohols include, but are not limited, to methanol, ethanol, and butanol. The method may also include combining the solid agglomerate with methyl acetate, ethyl acetate, or combinations thereof. The solid agglomerate may be reacted completely dry, or with a moisture content between 0 to 60 wt. %, or alternatively, from 10 to 40 wt. %, or, alternatively, from 20 to 30 wt. %, based on the total weight of the solid agglomerate. In one embodiment, alcohol may be combined in a weight ratio ranging from 0.1 to 20 parts by weight alcohol, or, alternatively, from 1 to 10 parts by weight alcohol, or, alternatively, from 2 to 4 parts by weight alcohol, all per 1 part by weight of the dry solid agglomerate. In one specific embodiment, ethanol may be combined in a weight ratio ranging from 0.1 to 20 parts by weight ethanol, or, alternatively, from 1 to 10 parts by weight ethanol, or, alternatively, from 2 to 4 parts by weight alcohol, all per 1 part by weight of the dry solid agglomerate.

The method of transesterifying the hydrolyzed lipid component may also include the step of heating the hydrolyzed lipid component and alcohol to a second temperature of at least 150° C. at a second pressure to form the biodiesel, with the provision that at least a portion of the alcohol is in the liquid phase throughout the step of heating to form the biodiesel or is in a super-critical fluid phase throughout the step of heating to form the biodiesel.

The step of heating the hydrolyzed lipid component and alcohol forms biodiesel comprising fatty acid alkyl esters. Throughout the step of heating the hydrolyzed lipid component and alcohol, the hydrolyzed lipid component present in the solid agglomerate typically reacts with the alcohol. Without being bound to any particular theory, it is believed that the alcohol, at the second temperature and the second pressure, extracts and (trans)esterifies the hydrolyzed lipid component retained in the solid agglomerate. In one embodiment, the step of heating the hydrolyzed lipid component and alcohol produces biodiesel present in an amount ranging from 60 to 99 wt. %, from 70 to 90 wt. %, or from 75 to 85 wt. %, all based on total weight of the dry solid agglomerate.

While not being bound to any particular theory, it is believed that when the solid agglomerate and alcohol are heated at the second temperature and the second pressure for the specified times, more fatty acid alkyl esters are formed than through conventional processing steps involving extraction with an organic solvent (e.g., hexane) and acid or base catalyzed transesterification. Also, it is believed that under certain conditions of temperature and time, any remaining glycerol released during the heating of the solid agglomerate and alcohol is decomposed and may form part of a suitable fuel component.

In one embodiment, ethanol is used. Ethanol is a renewable product and has a low toxicity. Furthermore, fatty acid ethyl esters produced by the method described herein typically demonstrate higher cetane numbers, improved lower temperature operability, and greater oxidative stability than fatty acid methyl esters.

The critical point of the alcohol is intended to mean the vapor-liquid critical point. The vapor-liquid critical point is the point where there are no longer phase boundaries between the liquid and gas phases. The vapor-liquid critical point comprises a critical temperature and a critical pressure. For example, the critical temperature of ethanol is about 241° C. at the critical pressure is about 6.3 MPa.

In one embodiment, the step of heating the hydrolyzed lipid component and the alcohol is conducted substantially in the absence of water, e.g., with less than 1.0 wt. % of water present based on the total weight of solid agglomerate. In another embodiment, the step of heating the hydrolyzed lipid component and alcohol is conducted in the presence of water. Water may be added or removed before or throughout the step of heating the hydrolyzed lipid component and alcohol to form the biodiesel. The amount of water may range from 1 to 75 wt. %, or from 1 to 40 wt. %, or from 1 to 10 wt. % based on the total weight of the solid agglomerate and alcohol.

The temperature present in the reaction vessel throughout the step of heating the hydrolyzed lipid component and alcohol to form the biodiesel is referred to as the second temperature. The second temperature may be at least 25° C. Depending on the type of transesterification that is being utilized, the second temperature may vary. If no catalysts are being added, the second temperature may range from 200 to 500° C., from 225 to 450° C., from 225 to 375° C., or from 225 to 350° C. or from 245 to 350° C. If no catalysts are being added, other second temperatures are also contemplated, so long as at least a portion of the alcohol is in the liquid phase or the super-critical fluid phase throughout the step of heating the hydrolyzed lipid component and alcohol to form biodiesel.

During the step of heating the hydrolyzed lipid component and alcohol at the second temperature, an elevated pressure may be present within the reaction vessel. The pressure present in the reaction vessel throughout the step of heating the hydrolyzed lipid component and alcohol to form the biodiesel is referred to as the second pressure. Typically, the second pressure may be present throughout the step of heating the hydrolyzed lipid component and alcohol. The second pressure may range from 0.1 to 25 MPa, from 0.1 to 20 MPa, or from 1 to 10 MPa, or from 6.3 to 10 MPa. Other second pressures are also contemplated, so long as at least a portion of the alcohol is in the liquid phase or the super-critical fluid phase throughout the step of heating the hydrolyzed lipid component and alcohol to form biodiesel.

In another embodiment, the second temperature and the second pressure are within super-critical conditions of alcohol, such that at least a portion of the alcohol is a super-critical fluid throughout the step of heating the hydrolyzed lipid component and alcohol to form the biodiesel.

Typically, the step of heating the hydrolyzed lipid component and alcohol continues for a period of time of at least 5 minutes. Alternatively, the step of heating the solid or agglomerate and alcohol continues for a period of time ranging from 30 to 200 minutes, from 30 to 160 minutes, from 60 to 120 minutes, or from 80 to 100 minutes. It is to be appreciated that, as discussed above, cellular components, e.g., proteins, fibers, and carbohydrates, in addition to the hydrolyzed lipid component present in the solid agglomerate, may also undergo the step of heating with alcohol.

In another embodiment, the step of transesterifying the hydrolyzed lipid component is further defined as heating the hydrolyzed lipid component and alcohol, at least in part, in the presence of a triflate catalyst. The step of transesterifying the hydrolyzed lipid component may also defined as heating the solid agglomerate and alcohol in the presence of the triflate catalyst. The addition of triflate catalysts to the solid agglomerate demonstrates potential to reduce the cost, energy, and environmental impact of biodiesel production from the wet biomass. These triflate catalysts are soluble in water and alcohol and they show excellent activity in aqueous solutions. In an embodiment, where the triflate catalyst is present, the step of heating the hydrolyzed lipid component and the alcohol may be conducted for a shorter time period and provide similar yields as compared where no catalyst is used. For example, the step of heating the hydrolyzed lipid component and the alcohol may be conducted for a time period ranging from 5 to 60 minutes, or from 5 to 45 minutes, or from 5 to 30 minutes, and still yield biodiesel. The step of heating of the heating the hydrolyzed lipid component The amount of triflate catalyst may be present in an amount ranging from 0.1 to 10 moles, or from 0.5 to 5 moles per mole of fatty acid in the hydrolyzed lipid component. The triflate catalyst is selected from the group comprising $Sc(OSO_2CF_3)_3$; $In(OSO_2CF_3)_3$; $Bi(OSO_2CF_3)_3$; and combinations thereof. It is also contemplated that the step of heating the wet biomass may be completed in the presence of the triflate catalyst. In another embodiment, the method may be performed without any catalyst materials. Alternatively still, the method may be performed in the presence of water, which may serve as a catalyst in some embodiments.

In another embodiment, the step of transesterifying the hydrolyzed lipid component is further defined as heating the hydrolyzed lipid component and alcohol in the presence of an enzyme to form the biodiesel. The step of transesterifying the hydrolyzed lipid component may also be defined as heating the solid agglomerate and alcohol in the presence of an enzyme to form the biodiesel. The enzyme may include, but is not limited to, immobilized extracellular lipases, immobilized whole cell catalysts, and combinations thereof. Specific examples of enzymes include *candida rugosa, P. cepacia, P. flourescens, R. oryzae*, novozyme, and combinations thereof. The step of heating the hydrolyzed lipid component and alcohol in the presence of the enzyme may be conducted at temperatures ranging from 25 to 100° C., or from 30 to 60° C.

In another embodiment, the step of transesterifying the hydrolyzed lipid component is further defined as heating the hydrolyzed lipid component and alcohol in the presence of an acid catalyst to form the biodiesel. The step of transesterifying the hydrolyzed lipid component may also be defined as heating the solid agglomerate and alcohol in the presence of the acid catalyst to form the biodiesel. The acid catalyst may include, but is not limited to, mineral acids. Examples of suitable acid catalysts include HCl and $H_2SO_4$. The temperature of heating in the presence of the acid catalyst may range from 50 to 500° C., as will be appreciated by one of ordinary skill in the art.

In another embodiment, the step of transesterifying the hydrolyzed lipid component is further defined as heating the hydrolyzed lipid component and alcohol in the presence of an basic catalyst to form the biodiesel. The step of transesterifying the hydrolyzed lipid component may also be defined as heating the solid agglomerate and alcohol in the presence of the basic catalyst to form the biodiesel. The basic catalyst may include, but is not limited to, KOH, NaOH, and combinations thereof. The temperature of heating in the presence of the acid catalyst may range from 50 to 500° C., as will be appreciated by one of ordinary skill in the art.

In one embodiment, the biodiesel comprises the fatty acid ethyl esters in an amount ranging from 65 to 100 wt. %, alternatively, from 80 to 100 wt. %, or, alternatively, from 90 to 99 wt. %, or, alternatively, from 95 to 98 wt. %, all based on the total weight of the biodiesel. The biodiesel may also comprise other fatty acid esters in various amounts.

The biodiesel may be washed to remove components other than the fatty acid alkyl esters. In one embodiment, the biodiesel is washed with alkaline water. In this embodiment, any components recovered from the biodiesel, including but not limited to, fatty acids and glycerides, may be recycled for use in another step of heating the hydrolyzed lipid component and alcohol. In another embodiment, water-free methods such as adsorption are used to purify the biodiesel.

In one embodiment, alcohol is recovered from the biodiesel using known methods such as distillation or liquid-liquid extraction for downstream use. The alcohol may be preserved for later use and recycled.

EXAMPLES

Biomass solids are grown in a bioreactor using sequential photo and heterotrophic growth phases. *Chlorella vulgaris* (University of Texas Culture Collection of Algae #259) is grown phototrophically in a series of six bubble column reactors (3.8 cm diameter×130 cm length each) continuously fed (approximately 60 mL/h) with a Modified Bold's Basal Medium (MBBM). Synthetic media is prepared with purified deionized water and adjusted to pH 7.2 with 1 M NaOH. A humidified 2-3% $CO_2$ air mixture is delivered to each column (0.3 volume of gas per volume of liquid per minute (vvm)) via a linear air pump (LT19, Whitewater) and a regulated $CO_2$ tank. Light is supplied continuously with cool-white fluorescent bulbs (SP-50 ECO, 32 W, GE), for a total light output at the tube surface of approximately 250 μmol $m^{-2}s^{-1}$. A PAR detector (MQ-303, Apogee Instruments) is used to measure irradiance. The bioreactors are maintained at room temperature (23-25° C.). The mean hydraulic residence time for each bioreactor is 7 days. Reactor effluent (ca. 3.5 L) is collected in a 10 L HDPE carboy for 2 days, and then transferred to a 4 L flask. Glucose (20 g/L) is added to each flask and the cells of *Chlorella vulgaris* are cultivated in the dark with aeration (1 vvm) and stifling for 7 days.

The dry weight of the biomass solids is measured gravimetrically following centrifugation of the contents of each flask (2000 RCF for 15 min) and drying of the resulting wet algal pellet (65° C. for 24 hours). A supernatant is retained to measure pH and $NO_3^-$ concentrations according to standard methods. After 7 days, heterotrophic cells are collected by centrifugation (250 mL bottles, 2000 RCF, 15 min), washed twice with distilled water, and dried. Solids are ground briefly (<15 seconds) with mortar and pestle to obtain a homogenous powder and are stored dry (4° C.) prior to use. Drying wet biomass and then rehydrating it allows for improved sample preservation during storage and precise control of solids loading in downstream reactions.

Baseline Method to Establish the Content of the Biomass Solids

N-hexane may be employed to extract lipids from the biomass solids prior to biodiesel synthesis to establish the content of the biomass solids. Hexane-isopropanol (3:2) is employed as a less toxic alternative to chloroform:methanol mixtures. In addition, isopropanol (IPA) has been found to minimize lipid degradation caused by lipolytic enzymes in plant tissues. Lipid extracts are not washed to avoid a reduction in lipid recovery.

Lipids within the biomass solids and solid agglomerate are extracted and analyzed to determine the composition thereof. Dry solids (ca. 30 mg) are loaded into glass tubes (16 mm 100 mm) with teflon-lined screw caps and extracted at 60° C. for 4 hours with 6 mL of n-hexane or a mixture of n-hexane:IPA (HIP, 3:2 v/v). Upon cooling, the tubes are centrifuged (2000 RCF for 15 min) and 2 mL of an upper solvent layer (i.e. lipid extract) is transferred to a 2 mL GC-vial and stored at 4° C. prior to analysis.

The lipid extract (50 to 500 μL) is transferred to two pre-weighed GC vials using the Agilent 7693A Automated Liquid Sampler (ALS). Any solvent is evaporated under $N_2$ (Visiprep Solid Phase Extraction Vacuum Manifold, Supelco) and mass of the lipid extract is determined gravimetrically (XS205DU, Mettler Toledo, readability=0.01 mg). Prior to analysis by HT-GC/FID, the lipid extract is derivatized with N-Trimethylsilyl-N-methyl trifluoroacetamide (MSTFA, derivatization grade, Sigma) to improve volatility of lipid components containing free hydroxyl groups (e.g., fatty acids, monoglycerides, and diglycerides). A modified micro-scale EN14105 procedure was adopted to automate standard and sample preparation, include fatty acid quantification, increase analysis throughput, and minimize experimenter exposure to hazardous solvents. Three internal standards (1,2,4-butanetriol, dodecanoic acid, and tricaprin) in pyridine (10 μL each; 6,000-8,000 ppm) and MSTFA (20 μL) are added to a vial, the vial is stirred for 1 minute, and allowed to react for 30 minutes at room temperature. n-heptane (700 μL) is added to the vial, the vial is stirred again, and contents of the vial are injected in an Agilent 7890 GC-FID with an ASTM6584 column (15 m×320 mm×0.25 μm, Agilent J&W). Injection (1.0 μL) is made to a cool-on-column inlet in oven-track mode with an initial oven temperature of 50° C. After a 1 min hold, the temperature is ramped to 180° C. at 15° C./min, 230° C. at 7° C./min, and 380° C. at 30° C./min. A carrier gas, helium, is applied at a constant flow rate of 3.0 mL/min. FID detector temperature is 380° C. and $N_2$ served as make-up gas (30 mL/min). Peaks corresponding to fatty acids, monoglycerides, diglycerides, and triglycerides are identified by retention time and quantified based on internal standard calibrations of oleic acid, monoolein, diolein, and triolein, respectively.

As a baseline, all of the lipids from the biomass solids are simultaneously extracted and esterified with an acid catalyzed in-situ esterification procedure. This procedure serves as the theoretical maximum ester yield possible from the biomass solids.

Dried algae (30 mg), hydrolysis solids (15 mg), or soy bean oil (15 mg, Sigma) are weighed into glass tubes (16 mm×100 mm) with teflon-lined screw caps and reacted with 2 mL freshly prepared ethanol (99%) containing 5% acetyl chloride at 100° C. for 90 min with vigorous stifling. Water (1 mL) is added to stop the reaction and fatty acid ethyl esters are extracted into 6 mL total n-hexane. The tubes are vortexed for 1 min and centrifuged (2000 RCF, 10 min). Approximately 2 mL of the upper hexane-fatty acid ethyl ester mixture is transferred to a GC vial. Fatty acid ethyl esters are identified and quantified by GC-FID with a modified version of EN14103 and the mass of biodiesel is determined gravimetrically in a manner similar to the lipid extract. A new vial containing the sample (195 μL) and internal standard (5 μL, tricosanoic methyl ester, $C_{23}$ fatty acid methyl esters, Sigma) is prepared by the 7963A ALS and injected (1 μL; 15:1 split ratio; 260° C. inlet temperature) onto an HP-InnoWax column (30 m×0.32 mm×0.25 μm, J&W 1909BD-113) with an initial oven temperature of 170° C. After a 3 minute hold, the temperature is ramped at 3° C./min to 250° C. Helium is the carrier gas at a constant flow rate of 1.0 mL/min. FID detector temperature is 260° C. and $N_2$ served as make-up gas (30 mL/min). Fatty acid ethyl esters are quantified based on internal standard calibration using a $C_4$-$C_{24}$ fatty acid ethyl esters mix (Sigma); total fatty acid ethyl esters calculations reflect all integrated area between fatty acid ethyl esters $C_{12}$ and $C_{24}$, as designated by EN14103. Vials containing pure n-hexane serve as negative controls (gravimetric yield on blanks is never greater than 0.1 mg).

Procedure and Exemplary Results for Formation of Biodiesel

All high temperature reactions are carried out in 316 stainless steel (SS) reactors fashioned from Swagelok™ parts (2 caps and 1 port connector). Once loaded, reaction vessels are immersed in a preheated, isothermal fluidized sand bath for a desired time and then promptly removed and cooled in water. A step of heating the wet biomass at a first temperature and a first pressure is carried out simultaneously in two reaction vessels. The larger reactor (10 mL) is loaded with dry algae (1 g) and water (5.3 g) and reacted for 15, 30, 45, and 60 min at 250° C. to form an aqueous solution and a solid agglomerate. Additional experiments were carried out at a first temperature of 225° C. and 300° C. Upon cooling, the aqueous solution and the solid agglomerate are separated by filtering under light vacuum. No additional water is used to rinse the reactor.

Samples of the aqueous solution are analyzed for ammonia, nitrite and nitrate using the phenate, Greiss reagent, and ultraviolet spectrophotometric methods, respectively. Soluble chemical oxygen demand is measured via a closed reflux titration method and total organic carbon (TOC) and total nitrogen (TN) are analyzed with a Shimazdu™ TOC-VCSN unit. Glycerol and other small organic compounds are measured by HPLC. For some reactions, the aqueous solution is hexane-extracted to detect lipid components. The solid agglomerate is stored at 4° C. prior to further processing; a portion of the solid agglomerate is dried to determine moisture content. The yield of the solid agglomerate is determined from a parallel reaction in which dry algae (0.5 g) and water (2.0 g) or wet algae paste (2.5 g) are loaded into smaller reaction vessels (4 mL). Upon cooling, 15 mL $H_2O$ is used to ensure complete solids recovery from the reactor. The solid agglomerate is filter-separated, dried (65° C., 24 hours), and massed.

The solid agglomerate and alcohol are combined. A step of heating the hydrolyzed lipid component and alcohol at the second temperature and a second pressure is carried out in 1.6 mL stainless steel reaction vessels with the solid agglomerates (60 mg) derived from the step of heating the wet biomass at 250° C. (first temperature) for 45 minutes. An exploratory $2^3$ factorial experiment is carried out to determine the effects of ethanol loading (2-8 mass ratio of ethanol to dry carbonized solids), reaction temperature (275° C. and 325° C.), and reaction time (60-120 min) on total biodiesel yield and composition. These parameters and suitable reactor dimensions are chosen based on previous work with ethanol and ASPEN modeling of oleic acid esterification. Following the reaction, reactor contents are filtered as described above; and ethanol (95%; 15 mL) is used to wash the reactor. Hexane (1 mL) is added to the empty reactor to ensure complete ester recovery without exposing the solid agglomerate to this solvent.

The ethanol-biodiesel mixture is collected in a round bottom flask. Ethanol is evaporated under vacuum at 70° C. and the biodiesel is weighed. The biodiesel is resuspended in hexane (5 mL), combined with the 1 mL hexane reactor wash, centrifuged to remove any remaining fine particles (2000 RCF for 10 min), and transferred to a GC vial. The hexane-biodiesel mixture is analyzed for fatty acid ethyl esters directly by GC-FID and the mass of biodiesel is determined gravimetrically, as described in greater detail above. Biodiesel (5-10 mg) in GC vials is then analyzed for triglycerides, diglycerides, monglycerides, fatty acids, and glycerol following treatment with MSTFA, as described in greater detail above. Each reaction condition is analyzed in duplicate. Response variables are analyzed in Minitab® (15.1.30.0) using analysis of covariance with $p<0.05$.

Results

As referred to above, a base line total lipid content of the biomass solids was measured as fatty acid ethyl esters produced through acid-catalyzed in-situ transesterification. The average percentage difference between gravimetric and GC determinations is less than 5%, indicating excellent instrument performance and minimal inclusion of non-detected impurities. HT-GC-FID analysis of hexane and hexane-isopropanol extractions reveal a lipid profile ranging from 91 to 95% triglycerides, from 2 to 3% diglycerides, less than 1% monoglycerides, and from 2% to 5% fatty acids.

The elemental composition of the biomass solids is 58.1% carbon, 9.1% hydrogen, 28.6% oxygen, 1.1% nitrogen, and 3.1% ash (by difference). The molecular formula for the biomass solids, not including ash, is approximately $C_{5.9}H_{11.0}O_{2.2}N_{0.1}$ having a molecular mass of about 117.8 g/mol. Theoretical chemical oxygen demand is 2.77 g COD/g VSS and 2.68 g COD/g TSS. Heat of combustion for the solid agglomerate is 27.34 MJ/kg. The observed nitrogen content of the biomass solids was 1%. Additionally, nitrogen in the media of one of the reaction vessels was consumed and biomass solids density increased sharply during heterotrophic growth, therefore indicating a concomitant decrease in the biomass solids nitrogen to lipid ratio. Such an effect is desirable because it indicates a more efficient use of nitrogen to produce lipids and minimizes the potential for nitrogen-containing biodiesel impurities (e.g. chlorophylls, phytosterols) that could lead to increased $NO_x$ emissions during combustion.

The lower temperature bound for the step of heating the wet biomass at the first temperature and the first pressure was determined in exploratory experiments that indicated formation of a black, charcoal-like solid agglomerate above 225° C. Conglomeration is suspected due to neutralization of cell's negative zeta potential and dehydration, condensation, polymerization, and aromatization reactions of polysaccharides in the cell wall and extracellular matrix. The rigid cell wall of C. vulgaris, comprising 3% to 6% of the cell dry weight, has been found to contain glucosamine and a variety of water-soluble (e.g. uronic acids, xylose, galactose, rhamnose, and glucose) and insoluble (e.g. cellulose and hemicellulose) polysaccharides. Observations suggest cellulose in the cell wall may be a major determinant of the temperature required for hydrothermal fusion.

Beyond recovering a solid agglomerate from the wet biomass, the step of heating the wet biomass at the first temperature and the first pressure may convert triglycerides in cytoplasmic lipid bodies to fatty acids. Wet biomass containing 20% solids by weight and 50% lipids by weight, on a dry weight basis has a water-to-oil ratio (WOR) of about 6.8 (v/v), 8.0 (w/w), and 393 (molar). The upper temperature limit for the first temperature was selected to limit excessive fatty acid isomerization and potential degradation that could negatively impact biodiesel fuel quality. While saturated and monounsaturated fatty acids are relatively stable below 300° C. in water, significant isomerization (i.e. cis to trans) of polyunsaturated fatty acids has been reported at sub-critical temperatures for water. Based on these reports, 250° C. was chosen for this initial investigation of how intracellular lipid content changed during hydrolysis.

The biomass solids are extracted with hexane-isopropanol and hexane to determine lipid composition of the biomass solids. No difference in the solids yield, elemental composition, or moisture content of the solid agglomerate was found when reactions were completed with freshly harvested wet biomass as compared to samples of the wet biomass which were dried and rehydrated. As expected, triglyceride content decreased and fatty acid content increased with time when the wet biomass was heated at 250° C. The highest conversion to fatty acid occurred after 60 min, resulting in a solid agglomerate containing 70 to 80% of the total lipids highly enriched in fatty acid. The content of monoglycerides also increased with time, while diglycerides concentration increased up to the 45 minute mark and then declined. Based on acid catalyzed in-situ esterification of the solid agglomerate, the fatty acid composition was relatively unchanged throughout the step of heating of the wet biomass at the first temperature and the first pressure to form the solid agglomerate and aqueous solution, and almost no degradation in linoleic acid was observed.

The solids yield on a dry weight basis for the step of heating the wet biomass at the first temperature and the first pressure throughout the step of forming the solid agglomerate and aqueous solution was 59 to 63 wt. %, based on the total dry weight of the biomass solids, shows little variation with time. Based on elemental analysis, this corresponds to a retention of 72 to 78% of the carbon originally present in the biomass solids. Total lipid retention throughout the step of heating the wet biomass at the first temperature and the first pressure varied from 77 to 90%, with the highest retention occurring at the shortest reaction time. The solid agglomerate samples presenting a solids yield of 63.1% and a lipid retention of 86.5%, whether dry or rehydrated at 45 minutes, were chosen for further downstream processing.

Carbon and nitrogen, not retained in the solid agglomerate, may be liberated in the aqueous solution. The aqueous solution typically has an acidic pH (~5). Soluble chemical oxygen demand was measured in the range ranging from 14 to 17 g/L, corresponding to from 8 to 17% of the wet biomass chemical oxygen demand. As with carbon, more nitrogen entered the aqueous solution at longer heating times. Ammonia-nitrogen accounted for between 1% and 3% of the total nitrogen, indicating that most nitrogen was liberated as organic compounds. Between 17 and 40% of the nitrogen in the original wet biomass was detected in the aqueous solution, whereas elemental analysis indicated that between 41 and 52% of nitrogen present in the wet biomass solids was retained in the solid agglomerate. The solid agglomerate generated from the heating of the wet biomass and water at 250° C. (first temperature) and 45 min was selected for heating at the second temperature and the second pressure on the basis of solids yield (63.1%), lipid retention (87%), moisture content (46%), and the percentage of triglycerides hydrolyzed (~70%). A $2^3$ factorial experiment is designed to explore the reaction space and discern the effects of time, temperature, and ethanol loading on the yield and composition of biodiesel. Reaction conditions are chosen based on relevant literature and preliminary results such that variations in the measured effects would be readily apparent.

Analysis of covariance revealed that longer heating times and higher temperatures led to increased biodiesel and fatty acid ethyl ester yields and significantly fewer non-fatty acid ethyl ester components in the biodiesel, particularly fatty acids and monoglycerides. In contrast, increased ethanol loading leads to increased gravimetric yields of biodiesel with concomitant increases in its non-fatty acid ethyl ester content. Biodiesel yields from heating lasting 120 min with an ethanol-to-solids ratio of 6.6-7.5 were comparable to the lipid content of the solid agglomerate as determined by hexane or hexane-isopropanol extraction. These heating patterns also demonstrated the greatest fatty acid ethyl ester yields on a dry solids loading basis (44 to 49%). Heating at 325° C. (second temperature) yielded more biodiesel with less monoglyceride content than heating at higher temperatures. In these reactions, fatty acid ethyl esters account for 57 to 59% of the biodiesel; a significant amount of fatty acids and monoglycerides remained unconverted. When matter remaining after heating at the second temperature and second pressure with ethanol was examined for lipids using acid-catalyzed in-situ transesterification, less than 4% lipids were detected on a dry weight basis.

Similar results were obtained in exploratory experiments conducted with more ethanol; when the solid agglomerate (300° C., 20 min) was heated at super-critical ethanol conditions (at much higher ratios, ca. 25 mg ethanol/mg dry solids) at 290° C. for 60, 90, and 120 min, the ester yield (% of dry solids) was 31.4%, 48.7%, and 37.6%, respectively. The biodiesel yield was also greatest at 90 min (79.7% of dry solids) and the ester content of the biodiesel (which was 60-61%) did not change between 90 and 120 minutes.

In all reactions, the water-to-oil ratio was constant (1.1 m/m), but reactions loaded with more ethanol had a lower total water content (cf. 8-10% to 20-21%).

The second temperature may have a significant affect on the fatty acid ethyl esters yield; higher temperatures also led to fewer non-fatty acid ethyl esters components, with monoglycerides being significantly less at 325° C., compared to 275° C. A higher ethanol loading led to increased gravimetric biodiesel yields, but did not significantly increase the amount of ester generated. In fact, the ester product contained significantly more fatty acids and monoglycerides in the high ethanol heatings.

However, high yields have been reported at longer times at lower temperatures, suggesting that below the temperature where degradation occurs, longer residence times almost always favor increased conversion because fatty acid methyl esters are only being consumed through the backward reaction with water to become fatty acids again, although this is very minimal. Our results at 275° C. and 325° C. at 120 min are very similar, though at 275° C. more glycerides remained unconverted.

The decomposition of glycerol throughout the step of heating at the second temperature and the second pressure is an advantage of the method described herein compared to traditional base or acid catalyzed transesterification which generates a glycerol by-product requiring removal and purification. While glycerol decomposition products (GDPs) may contribute to biodiesel as fuel components, and may even improve biodiesel viscosity and cloud/pour point, the instant method similarly obviates costly glycerol removal while conserving glycerol as a valuable carbon source for the production of additional lipid-rich microheterotrophs. The backward reaction of glycerol with methyl esters is suppressed because glycerol is removed throughout the step of heating the wet biomass at the first temperature and the first pressure to form the solid agglomerate and the aqueous solution. Though a solid agglomerate containing almost entirely fatty acid is the ideal feedstock for the step of heating the hydrolyzed lipid component and ethanol at the second temperature and the second pressure, some remaining glycerides were present in the solid agglomerate.

Because thermal decomposition and isomerization is negligible at 275° C., longer heating times are expected to increase conversion. This was apparent in the yield of both the biodiesel and fatty acid ethyl esters. At 325° C. (second temperature), increasing the heating time from 60 to 120 minutes decreased both biodiesel and fatty acid ethyl ester yield at the lower ethanol loading but increased yields at the higher ethanol loading.

It is to be understood that the appended claims are not limited to express any particular compounds, compositions, or methods described in the detailed description, which may vary between particular embodiments that fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and/or in combination and provides adequate support for specific embodiments within the scope of the appended claims.

It is also to be understood that any ranges and subranges relied upon in describing various embodiments of the present invention independently and collectively fall within the scope of the appended claims and are understood to describe and contemplate all ranges, including whole and/or fractional values therein, even if such values are not expressly written herein. One of skill in the art readily recognizes that the enumerated ranges and subranges sufficiently describe and enable various embodiments of the present invention and such ranges and subranges may be further delineated into relevant halves, thirds, quarters, fifths, and so on. As just one example, a range "ranging from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims and may be relied upon individually and/or collectively and provide adequate support for specific embodiments within the scope of the appended claims.

In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange ranging from at least 10 to 35, a subrange ranging from at least 10 to 25, a subrange ranging from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "ranging from 1 to 9" includes various individual integers, such as 3, as well as individual numbers including a decimal point (or fraction), such as 4.1, which may be relied upon and provide adequate support for specific embodiments within the scope of the appended claims.

The invention has been described in an illustrative manner and it is to be understood that the terminology which has been used is intended to be in the nature of words of description rather than of limitation. Many modifications and variations of the present invention are possible in light of the above teachings and the invention may be practiced otherwise than as specifically described.

What is claimed is:

1. A method of producing a biodiesel from a wet biomass, the method comprising:
   providing the wet biomass comprising water and biomass solids;
   heating the wet biomass at a first temperature and a first pressure for a time period ranging from 10 to 480 minutes to form an aqueous solution and a solid agglomerate containing a hydrolyzed lipid component, wherein the first temperature ranges from 150 to 300° C., with the proviso that at least a portion of the water present in the wet biomass is in a liquid phase throughout the step of heating to form the aqueous solution and the solid agglomerate, and that the first temperature and first pressure are below super-critical conditions for water; and
   transesterifying the hydrolyzed lipid component to form biodiesel.

2. The method of claim 1, wherein the step of transesterifying the hydrolyzed lipid component is further defined as heating the hydrolyzed lipid component and alcohol to a second temperature of at least 200° C. at a second pressure to form the biodiesel, with the proviso that at least a portion of the alcohol is in a liquid phase or is in a super-critical fluid phase throughout the step of heating to form the biodiesel.

3. The method of claim 2, wherein the alcohol is provided in a ratio ranging from 0.1 to 10 parts by weight of alcohol per 1 part by weight of the solid agglomerate on a dry weight basis.

4. The method of claim 2, wherein the second temperature and the second pressure are within super-critical conditions for the alcohol.

5. The method of claim 1, wherein the step of transesterifying the hydrolyzed lipid component is further defined as heating the hydrolyzed lipid component and alcohol in the presence of an enzyme to form the biodiesel.

6. The method of claim 1, wherein the step of transesterifying the hydrolyzed lipid component is further defined as heating the hydrolyzed lipid component and alcohol in the presence of a triflate catalyst to form the biodiesel.

7. The method of claim 6, wherein the triflate catalyst is selected from the group consisting of $Sc(OSO_2CF_3)_3$; $in(OSO_2CF_3)_3$; $Bi(OSO_2CF_3)_3$ and combinations thereof.

8. The method of claim 1, wherein the step of transesterifying the hydrolyzed lipid component is further defined as heating the hydrolyzed lipid component and alcohol in the presence of an acidic catalyst to form the biodiesel.

9. The method of claim 1, wherein the step of transesterifying the hydrolyzed lipid component is further defined as heating the hydrolyzed lipid component and alcohol in the presence of a basic catalyst to form the biodiesel.

10. The method of claim 1, further comprising the step of extracting the hydrolyzed lipid component from the solid agglomerate with the proviso that the step of extracting the hydrolyzed lipid component is conducted before the step of transesterifying the hydrolyzed lipid component.

11. The method of claim 1, wherein the step of transesterifying the hydrolyzed lipid component is conducted in the presence of water.

12. The method of claim 1, wherein the wet biomass comprises at least 80 wt. % water based on the total weight of the wet biomass.

13. The method of claim 1, further comprising separating at least a portion of the aqueous solution from the solid agglomerate.

14. The method of claim 13, wherein separating at least a portion of the aqueous solution from the solid agglomerate is further defined as filtering at least a portion of the aqueous solution from the solid agglomerate.

15. The method of claim 14, wherein the aqueous solution comprises glycerol and at least one amino acid.

16. The method of claim 1, wherein the wet biomass is heated at the first temperature and the first pressure for a duration ranging from 30 to 480 minutes.

17. The method of claim 1, further comprising washing the biodiesel with alkaline water.

18. The method of claim 1, wherein the step of transesterifying the hydrolyzed lipid component comprises heating the solid agglomerate and the hydrolyzed lipid component to form biodiesel.

* * * * *

UNITED STATES PATENT AND TRADEMARK OFFICE
CERTIFICATE OF CORRECTION

PATENT NO. : 8,673,028 B2
APPLICATION NO. : 13/224872
DATED : March 18, 2014
INVENTOR(S) : Phillip E. Savage et al.

It is certified that error appears in the above-identified patent and that said Letters Patent is hereby corrected as shown below:

IN THE CLAIMS:

Claim 7, Column 20, line 41, delete "in$(OSO_2CF_3)_3$" and replace with -- In$(OSO_2CF_3)_3$ --.

Signed and Sealed this
Sixth Day of January, 2015

Michelle K. Lee
*Deputy Director of the United States Patent and Trademark Office*